INVENTOR.
Arthur A. Leedy, John T. Pope
& Harry M. Zimmerman
BY William Cleland
Attorney

United States Patent Office 3,426,421
Patented Feb. 11, 1969

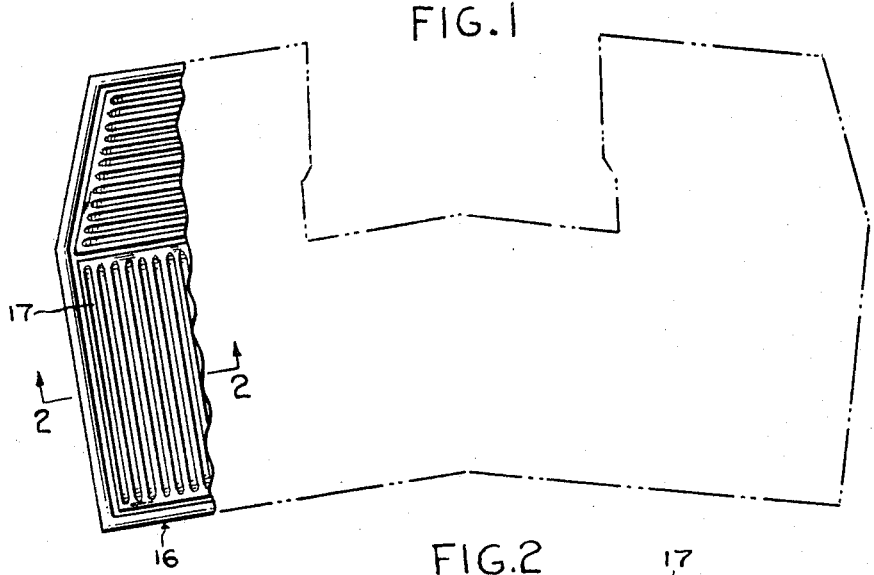
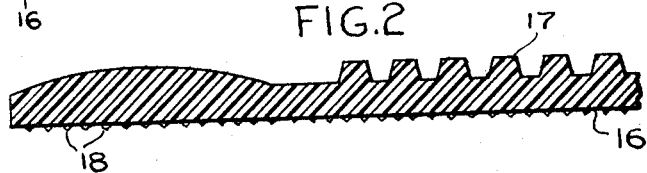
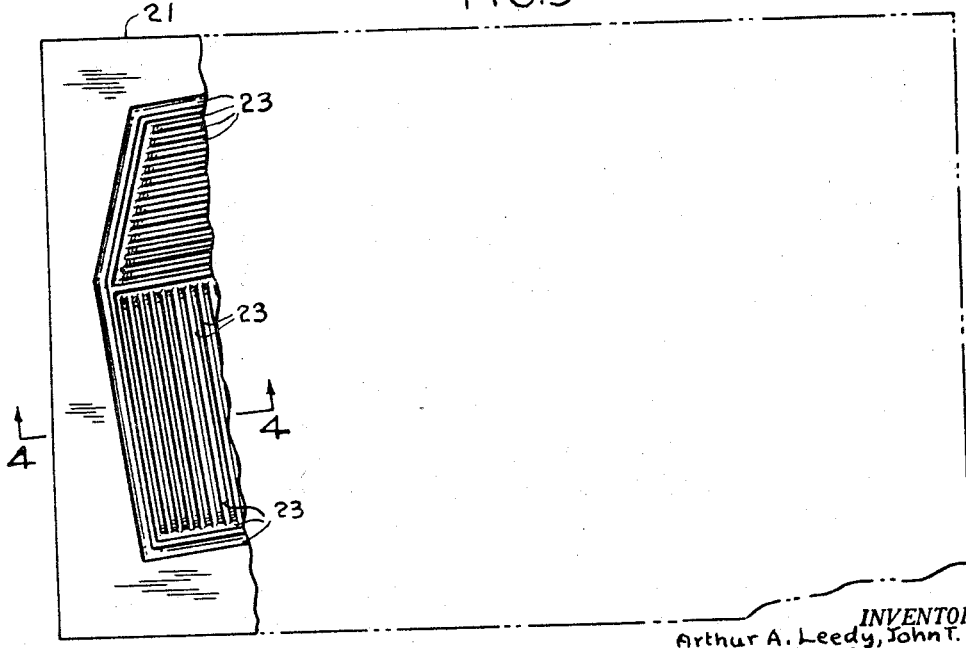

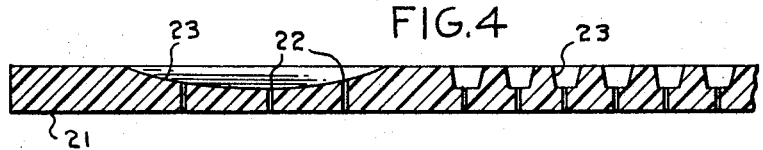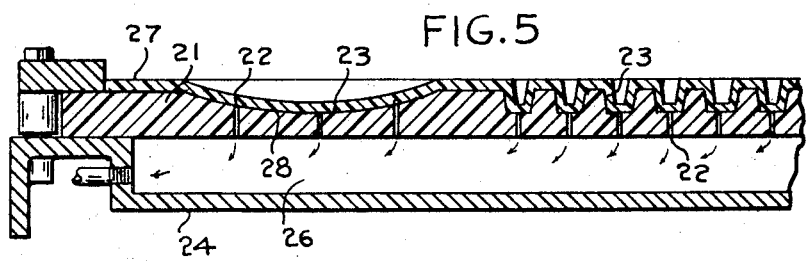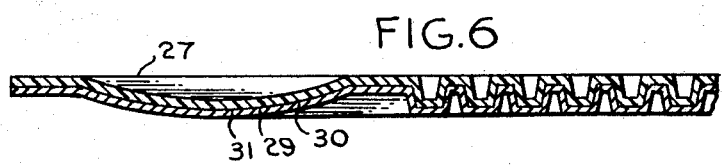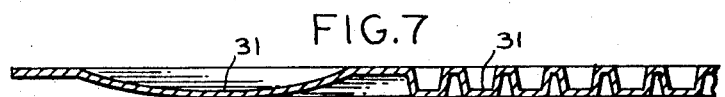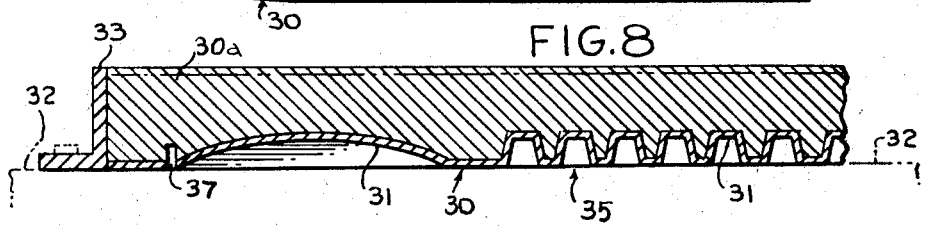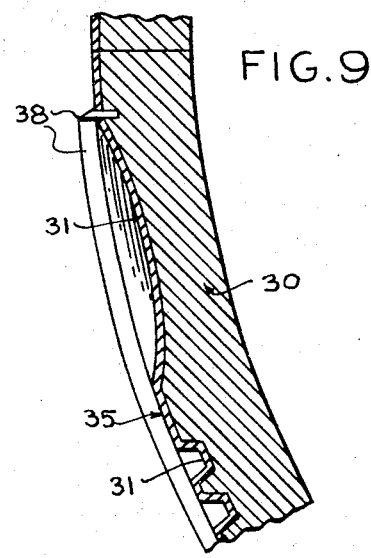

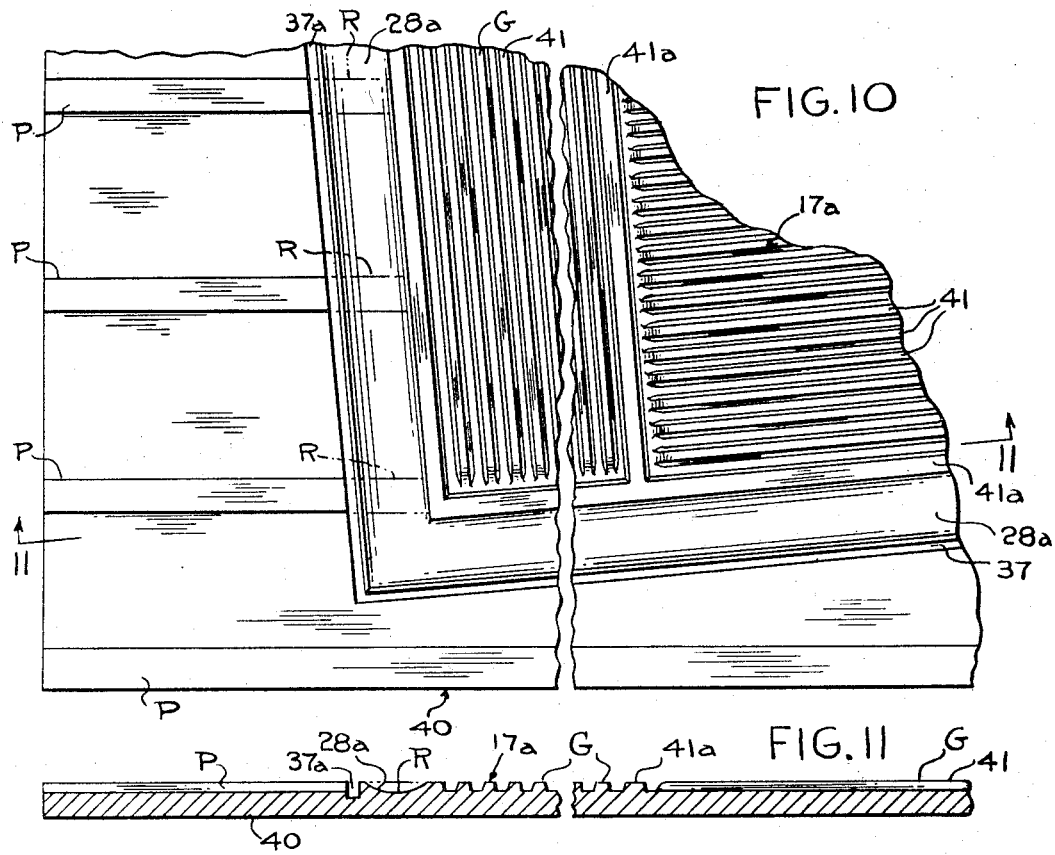
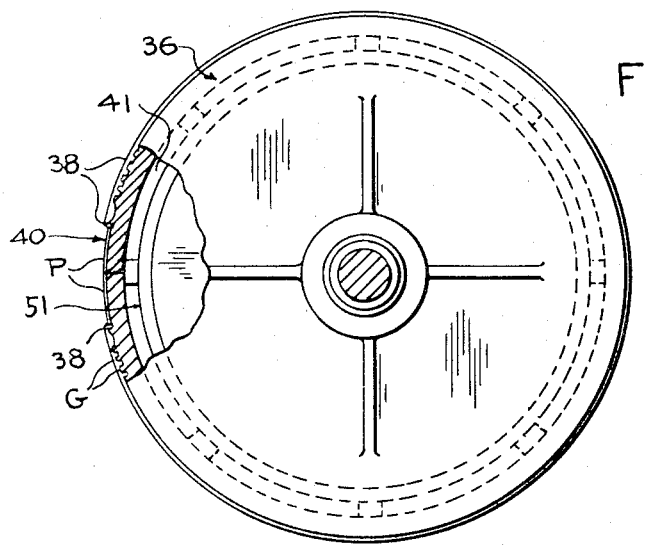

3,426,421
METHOD FOR MAKING ROLL-TYPE DIES FOR CONTINUOUSLY PRODUCING FLAT MATS
Arthur A. Leedy, Fort Lauderdale, Fla., John T. Pope, Rittman, Ohio, and Harry M. Zimmerman, Baton Rouge, La., assignors to Seilon, Inc., a corporation of Delaware
Original application Oct. 10, 1962, Ser. No. 229,543, now Patent No. 3,256,376. Divided and this application Jan. 25, 1966, Ser. No. 522,878
U.S. Cl. 29—529                                          4 Claims
Int. Cl. B23p 17/00; B29c 1/02; B22d 19/00

ABSTRACT OF THE DISCLOSURE

Method of making drum-type mold for forming plastic floor mats includes machining into planar side of rigid metal plate to form negative of flat mat design, including elongated ribs defined by grooving, the rib surfaces constituting major proportion of the total area of negative design configurations. In subsequent step of rolling plate to circular shape between bending rollers there is always substantially continuous smooth rolling engagement of rollers with coplanar design surfaces, along progressively moving lines of contact of the rollers with the plate. Where mat mold design requires relatively wide recessed portions, continuous rolling engagement is maintained by temporary or permanent roller-engaging portions of plate. Bending failures are thereby obviated by preventing rollers from engaging within recessed portions of negative design. Modified method utilizes mat die formed of different formable materials rolled to circular shape.

---

This application is a division of application Ser. No. 229,543, filed Oct. 10, 1962, now Patent No. 3,256,376.

This invention relates to methods for making roll-type dies of the type used for continuously producing flat mats of elastic plastic material.

Up to the present time, mats of the type commonly known as "storm mats," generally provided to cover floor areas of automobiles, have been made by vulcanizing compounded rubber in a flat mold in a hydraulic press, or by vulcanizing the rubber in a contoured pan provided with a vacuum forming cavity.

As the flat molds could have negative designs accurately cut thereon, the mats molded directly therein had accurately formed three dimensional impressions. The flat molding method however, when used for producing mats of elastic plastic was slow and uneconomical, because the mold was necessarily stationary during the vulcanizing cycles, and could not be opened for removal of the plastic articles before undergoing a mold-cooling period to prevent the stock from blistering or sticking to the mold.

Vacuum methods of making contoured mats on contoured molds were likewise slow and uneconomical, and had certain additional disadvantages arising from use of relatively low article-forming pressures.

Circular or drum-type molds have not been satisfactorily used in the past for making such flat mats with three-dimensional design configurations. As the designs were required to be on the convex side of the curved mold, there was no economical means available for accurately machining such designs. Metal molds machined in the flat, for example, could not thereafter be rolled on bending rollers because of a strong tendency for the mold to buckle or warp under necessary heavy bending stresses.

One object of the present invention is to provide an improved method and apparatus for continuous production of flat mats of elastic plastic material on a drum-type roll, by which the flat mats will have the same accurate mirroring of the mat design as is obtainable from a flat negative pattern.

Another object of the invention is to provide an economical method for making a circular negative mold from a flat, positive master pattern.

Another object of the invention is to provide a continuous method of making accurately formed flat mats, and by which the formed mats are self-trimmed from a continuous sheet of synthetic resin plastic material.

Another object of the invention is to provide an improved method of making floor mats, which requires no handling of the mat material from the time the raw material is fed into an extruder which supplies the plastic sheet to the drum-type mold until the self-trimmed mats are delivered from the same.

Another object of the invention is to provide a method of producing mats of superior quality from polyvinyl chloride, as compared to mats made from compounded rubber, for example, and which will have strong wear resistance, will make possible a wider range of bright, attractive colors, and will possess a feel of high quality, as well as a flexibility which allows the mat to shape itself neatly to irregularities on an automobile floor, for example.

Another object of the invention is to provide an improved method for making a drum-type mold of sheet metal, such as steel or brass, without distorting the same during the step of rolling the sheet to desired curvate shape.

Other objects of the invention will be manifest from the following brief description and the accompanying drawings.

Of the accompanying drawings:

FIGURE 1 is a top plan view, partly in full and partly in chain-dotted lines, illustrating a flat automobile floor mat made in accordance with the present invention.

FIGURE 2 is an enlarged fragmentary cross-section taken substantially on the line 2—2 of FIGURE 1.

FIGURE 3 is a view similar to FIGURE 1, and on the same scale, illustrating as a step in the method of making a drum-type mold, a flat pattern including the same three-dimensional design configurations as shown in the mat of FIGURES 1 and 2, but in the negative thereof.

FIGURE 4 is a fragmentary cross-section of said negative pattern, as viewed substantially on the line 4—4 of FIGURE 3.

FIGURE 5 is a view corresponding to FIGURE 4, illustrating the flat negative pattern secured to a vacuum box, and with a sheet of hardenable plastic material vacuum-formed to the negative design of the pattern to produce a hardened sheet having a positive design transferred thereon.

FIGURE 6 is a view corresponding to FIGURE 5, wherein the hardened plastic sheet has been stripped from the pattern, and a layer of copper has been electroplated over a thin coating of silver on the positive side thereof, to form a rigid negative shell.

FIGURE 7 is a view corresponding to FIGURE 6, but in which the positive electroplated shell has had the hardened plastic sheet stripped therefrom to expose the negative side of the shell.

FIGURE 8 is a view showing the electroplated shell inverted within the frame to receive a thick reinforcing backing of lead on the positive side thereof.

FIGURE 9 is a fragmentary cross-section illustrating the reinforced negative mold of FIGURE 8 after it has been rolled to cylindrical shape, with the negative design side outward, and having article-trimming blades affixed thereto.

FIGURE 10 is a fragmentary top plan view, on a smaller scale, of a modified form of negative mold for making a mat similar to that shown in FIGURES 1 and 2.

FIGURE 11 is a cross-section, substantially as viewed on the line 11—11 of FIGURE 10, and on the same scale.

FIGURE 12 is an end view, on a reduced scale, of a drum-type mold having mounted thereon a circular mold made by an improved method from the flat plate shown in FIGURES 10 and 11.

Figure 13:
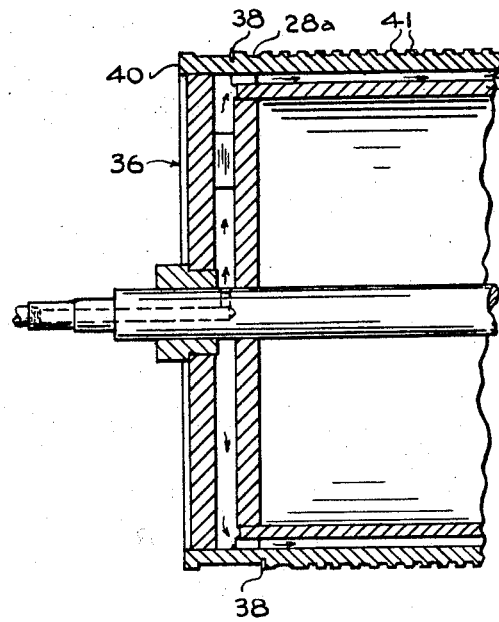
FIGURE 13 is a vertical cross-section, of the drum-type mold shown in FIGURE 12.
Figure 15:
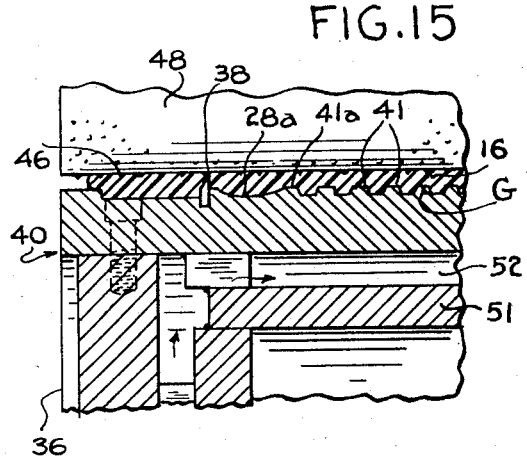
FIGURE 15 is an enlarged fragmentary cross-section as viewed substantially on the line 15—15 of FIGURE 14, and illustrating the self-trimming feature of the drum-type molding equipment.

Referring first to FIGURES 1 and 2 of the drawings, the numeral 16 designates a flat storm mat, as for an automobile floor, the same being of flexible, rubber-like material such as molded polyvinyl chloride. The top side of the mat has molded therein a three-dimensional design configuration 17. The design portion 17 may be generally of rib-like construction, with the ribs extending in specific angular directions for purposes to be described later in connection with one method of making circular mold plates. The underside of mat 16 is shown as having integrally molded thereon light nonskid portions 18.

One method for making a circular or drum-type mold plate is illustrated in FIGURES 3 to 9. The steps of this method may be as follows:

First a relatively thin, flat but rigid pattern 21 is built up, in any suitable manner, from wood, hard plastic, or other readily workable material, to have on the upper side thereof three-dimensional design configurations which are in the negative of the desired design for the mat to be produced. The pattern 21 is preferably somewhat larger than the desired mold plate, and is provided with a multiplicity of small holes 22 which extend from the flat underside of the pattern to low points in the various cavities 23, 23 forming the design thereon (see FIGURES 4 and 5).

The pattern 21 is now suitably clamped in fluid-sealed relation to a vacuum pan 24, as by means of a frame 25 on the vacuum pan (see FIGURE 5), to close the vacuum cavity 26 of the same.

Next, a sheet 27 of from .063 to .10 inch thick, and of rigid vacuum formable, synthetic resin plastic material, is heated to approximately 300° F., as by means of a series of radiant heaters. When very soft and pliable, it is laid upon the pattern to cover the negative design thereof, including all of the vacuum holes 22. Vacuum is then applied within the cavity 26 and through the holes 22 to draw all trapped air from beneath the plastic sheet 27, whereby the external atmosphere pressure presses the softened plastic in and around the design configurations of the pattern. After cooling the formed plastic sheet or matrix 27 by suitable means, it again becomes sufficiently rigid to be lifted from the pattern with a positive design 28 sharply outlined on the underside thereof (see FIGURE 5).

The positive design surfaces of the formed plastic sheet 27 are now thoroughly cleaned by scrubbing and allowed to dry. A thin electroconductive coating, indicated by heavy lines at 29 in FIGURE 6, is provided on said cleaned surfaces, as by spraying with a solution of metallic silver. Upon drying, the conductive coating 29 is used as an electrode, in a known type of electroplating operation, to build up thereon a thin uniform thickness of copper, such as a thickness of from .025 to .035 inch (see FIGURE 6). The resultant relatively rigid copper shell 30, with a requisite negative design 31 sharply outlined therein, is easily separated from the formed plastic sheet or matrix 27.

The rigid copper shell 30 is next inverted to have the concave or negative side thereof positioned downward upon a flat surface 32 within a liquid-tight frame 33, and molten lead 30a is poured over the shell, as shown in FIGURE 8, to a total thickness of more than .225 inch, for example. Shell 30 may be heated to the temperature of molten lead for this pouring operation. The design face of the copper shell 30 may be treated to prevent seepage of lead onto the same. When the lead has cooled, the resultant leadbacked mold plate 35 is removed from frame 33 and machined to a uniform reduced given thickness, suc has .225 inch, as indicated by a chaindotted line in FIGURE 8. At the same time the backed mold plate 35 may be machined to desired rectangular shape and size.

This flat, leadbacked plate 35 is next rolled to given diameter to have the negative design configurations on the outside, as shown in FIGURE 9. This is easily accomplished, with use of roller-type bending equipment (not shown), because of the known relative pliability of lead and the relative flexibility of the thin though rigid copper shell. In other words, while the shell 30 per se is selfsupportingly rigid, it is inherently relatively thin and somewhat flexible. The rolled mold plate, however, has a requisite degree of rigidity for use thereof in three-roll molding equipment of the type shown in FIGURES 12 to 15.

After cleaning the design surfaces of the rolled mold plate 35, article-forming surfaces are chrome plated, as a form of protection and to improve the smoothness as well as the appearance of the surfaces. Plate 35 may then be secured to the large drum 36 of the molding equipment (see FIGURES 12 and 13). The negative design of the rolled mold plate 35 is an exact duplicate of the negative design of the flat pattern 21.

This method has a distinct advantage in that any number of duplicate mold plates 35 may be made from the same flat pattern 21. The circular mold plate 35 may have a single article-forming cavity for making large mats, or multiple cavities may be grouped around the mold plate.

While the mold plate 35 is still in flat condition grooves, indicated at 37 in FIGURE 8, may be cut or machined in the design side thereof, corresponding to the outline of a finished mat of FIGURES 1 and 2 to be produced by use of the subsequently completed mold plate. After the mold plate is rolled, as described, preshaped cutter blades 38 are concentrically set within the grooves 37, as best shown in FIGURE 9.

A modified method of producing a mold plate is illustrated in FIGURES 10, 11 and 12, in conjunction with FIGURES 1 and 2. By this method a thick, flat plate 40 of rigid metal, such as steel or brass, has one planar side machined to provide three-dimensional design configurations directly therein, in the negative of the mat design shown in FIGURES 1 and 2, and including grooving 37a corresponding to the grooves 37 of FIGURES 8 and 9. In creation of the desired mat design 17a, however, care is taken to provide a maximum area of exposed outer surface portions 41, 41 of the design configurations in a common plane. The percentage of said exposed surface portions 41 should be on the order of twenty percent or more of the total area of said one planar side of the plate.

Plate 40 is then rolled to predetermined diameter, by feeding the same lengthwise inwardly between smooth surfaced bending rollers (not shown), to have the negative design outwardly of the rolled plate. During such rolling operation, the smooth surfaces of the rollers will be in substantially continuous, smooth rolling engagement with said exposed coplanar surfaces 41 along the progressively moving lines of contact of the rollers with the plate, so that no buckling can occur to distort the plate or the design, and so that in the completely rolled plate 40, as shown in FIGURE 12, the outwardly exposed surface portions 41 will lie in an imaginary cylinder defined by the outer periphery of the rolled plate 40. For this purpose, various portions 41 of the negative design configurations in the rolled plate, may extend or be grouped to extend generally peripherally and/or helically of the same, or such surface portions may be in any form of peripherally and axially staggered overlapping relationships which will accomplish the aforesaid smooth rolling engagement. Wide marginal rolling surfaces around all sides of the flat plate will provide satisfactory rolling engagement, possibly with a smaller total area of rolling surface defined by the design configurations, providing that the marginal surfaces will be angularly disposed to the straight lines of contact with the bending rollers.

Where rib-forming grooves of any appreciable width, such as the groove 28a, are to extend axially of the cylindrical mold, the smooth rolling action of the bending rollers may be interrupted by inward reception of the corresponding bending roller within such groove. This condition may be corrected by providing temporary spaced ribs R (as shown in FIGURES 10 and 11) for smooth engagement thereof by the bending roller (not shown), these temporary ribs being removed or reduced after the bending operation, as by machining, buffing, or grinding means. Likewise, when other design-forming recesses are of substantial length, they are likely to divert the respective bending roller, temporary roller-engaging portions may be provided and similarly removed when the mold plate is formed. Recessed extensions of the flat mold plate, as shown in FIGURES 10 and 11, designed to receive excess article-forming material, may have permanent, roller engaging ribbed portions P extending lengthwise or longitudinally of the mold plate.

Where rib-forming grooves G, for example, of the cylindrical formed mold plate of FIGURES 10 and 11, extend substantially at right angles to a groove-forming rib 41, air may become trapped at the ends of the grooves when the plastic material is progressively roll-pressed into the mold at the ends of the grooves. To obviate possible formation of defects in the mat due to such air pockets, the ends of the groove-forming ribs, may be radiused inwardly to a point short of the respective angularly disposed groove-forming rib 41a. Thus, the grooves defined between the ribs will be interconnected at the ends thereof to provide run-out means for said trapped air.

Figure 14:
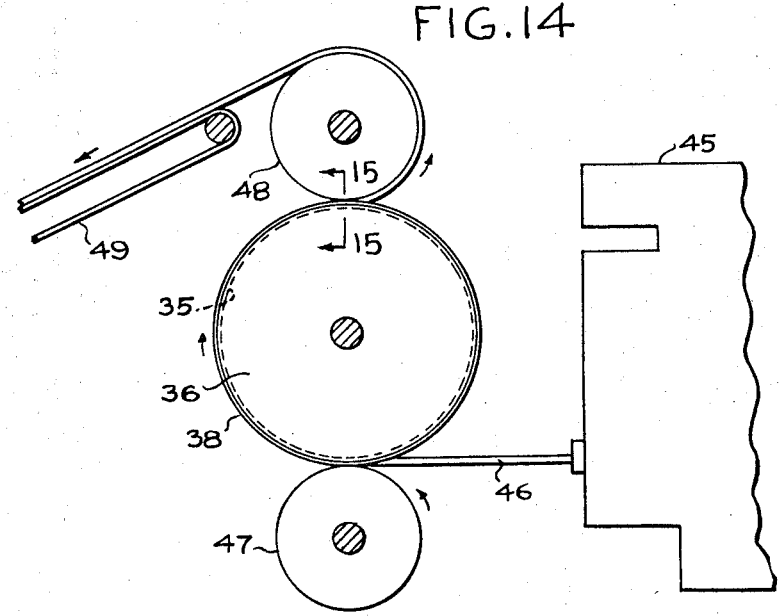
FIGURE 14 is a semidiagrammatic view, on a reduced scale, of a plastic extruder in association with drum-type mold equipment, utilized in the improved process for continuous production of flat mats.

Referring to FIGURE 14, there is diagrammatically illustrated suitable equipment for continuous production of the mats shown in FIGURES 1 and 2. The numeral 45 designates an extruder of known type in which a colorful-synthetic resin plastic component, such as for polyvinyl chloride, is mixed and heated to 330° F. to 350° F. The hot plastic is extruded as a sheet 46 of requisite uniform thickness and continuously fed to the rotating drum 36, on which is mounted either the cylindrical mold plate 35 of FIGURE 9 or the cylindrical mold plate 40 of FIGURES 12 and 13. A pressure roller 47 beneath drum 36 is adjustably operable to press the hot pliable sheet 46 into the design configuration of the mold plate on drum 36. At least the outer surface portions of the roll or roller 47 may be of rubber-like elastic material, and provided with a nonskid pattern to be impacted to the backs of the mats to be produced in the equipment. The variable distance between the drum 36 and pressure roller 47 controls the thickness of the formed mats. The distance the hot sheet 46 must travel with respect to mold drum 36 may also be suitably controlled for purposes to be described. A takeoff roll 48 is provided at the upper portion of drum 36 to maintain the plastic in contact with at least one-half of the circumference of the mold plate. Drum 36 and rolls 47 and 48 may be hollow to provide chambers through which may circulate steam or cold water, supplied through the respective shafts of the rolls, for requisite temperature control of the molding equipment.

In operation of the mat-forming equipment of FIGURE 14, the hot pliable extruded sheet 46, upon entering the bight between drum 36 and the resilient pressure roller 47, is squeezed into the design, and at that point the self-trimming blades 38 are pressed into the sheet to slightly less than the total thickness of the compressed sheet. Upon leaving the bight the plastic sheet passes upwardly with clockwise rotation of drum 36, as viewed in FIGURE 14, and is guided around counterclockwise rotated roller 48 and onto a suitable conveyor means 49.

The pressure applied to drum 36 by resilient roll 47 causes the compressed plastic material to be very thin along the cutting lines so that a complete cut-through by blades 38 would not be desirable at this stage. Roll 48, therefore, is utilized to complete the cutting action of the blades against the relatively cooler stock in the subsequent stage shown in FIGURE 15. On the conveyor means the formed mats (see FIGURES 1 and 2) are readily separated from the continuous sheet, either manually or by suitable mechanical means (not shown). As the formed plastic sheet leaves molding drum 36 to engage the top roll 48 the design will have been completely and permanently formed and there will be no tendency for it to lose its sharp detail or to flatten out.

If it is desired to cool the plastic while it is in contact with the mold plate, cold water may be substituted for steam within the drum. For the purpose of controlling the temperature of drum 36, a smaller hollow cylindrical member 51 may be provided in the same to define a closed cylindrical space 52 within which the steam and/or cooling water may be circulated in more closely confined relationship to the mold plate of the drum.

Polyvinyl chloride mats made by the method above described for making the same are of much higher quality than rubber mats, for example, and have much higher resistance to wear and tear. Moreover, the improved mats may be made in a greater range of bright and attractive colors than rubber mats. They possess a distinct feel of quality and flexibility, and readily conform from flat condition to variously contoured floors of automobiles.

As indicated in FIGURE 14, the bight between the rubber roller 47 and the drum mold 36 is sufficiently close to the extrusion orifice of the extruder 45 that the sheet material 46 will be in substantially the same hot, pliable condition when it enters said bight as it is at said extrusion orifice as described above. Also, the resilient roller 47, being of much smaller diameter than the cylindrical mold plate 35, assures that there will be axial line-contact pressure of the roller 47 against said hot, pliable sheet 46, effectively, to force the material thereof into the full conformity with the mold design configurations. That is, while the rubber-like resiliency of roller 47 assures uniform conformity of the sheet 46 with mold configurations of varying depths axially across drum 36, the small size of roller 47 inherently minimizes peripheral deformation of the same to cause entrapment of air in the mold design recesses and thereby cause deformities in the molded mat design. That is, the runout means described above in connection with release of entrapped air is made more effective. That is particularly important in connection with the production of polyvinyl chloride floor mats on a water-cooled drum mold 36, in which instance the formed vinyl sheet material 46 would tend to set or harden almost immediately upon contact thereof with the cooled drum mold.

Other modifications of the invention may be resorted to without departing from the spirit thereof or the scope of the appended claims.

What is claimed is:

1. A method of making a drum-type mold for producing flat mats from pliable sheet material, comprising: the steps of providing a flat mold plate of rigid but formable metal with opposite parallel planar sides; machining into a planar side of said plate, article-forming cavity means including three-dimensional protrusions and recesses for design configurations in the negative of recesses and protrusions, respectively, constituting desired design configurations of the flat mat to be made from the mold; the overall outer surface area of the article recess-forming protrusions on said planar side constituting a major proportion of the total area of said negative design configurations of the plate; and rolling said flat plate between smooth-surfaced bending rollers for continuous smooth rolling engagement thereof with said overall outer surface area of said machined planar side and the other said planar side, thereby to form the flat plate to predetermined cylindrical shape with the negative design configurations exposed outwardly, said major proportion of the total area engaged by the respective bending roller being on the order of at least twenty percent of said total area of the negative design configurations, said protrusions of the negative design configurations in the plate including elongated design surface areas adapted to extend angularly of parallel lines of pressure contact between said machined planar side of the plate and a corresponding said bending roller in said pressure contact therewith.

2. A method as in claim 1, wherein recessed portions in said planar side, not forming a part of said negative design configurations for the flat mat, are provided with rib portions for smooth rolling engagement of the respective bending roller therewith; and including the step of removing at least parts of said rib portions after the plate has been rolled to cylindrical shape.

3. A method of making a roll-type die for producing flat mats from pliable sheet material; comprising the steps of providing a flat pattern of relatively hard material having in one planar side thereof three-dimensional design configurations in the negative of desired design configurations of the flat mat to be made from the mold; vacuum-forming a hardenable plastic sheet to said negative design configurations to impart positive design configurations thereto and causing the formed plastic sheet to harden; applying a coating of electroconductive material to said positive design configurations of the formed plastic sheet, and electroplating a substantial thickness of metal to said coating, thereby to form relatively rigid but formable shell having negative design configurations thereon in duplicate of the negative design configurations of the planar negative side of said pattern; removing said hardened plastic sheet from said shell to expose the planar negative design side of the shell; providing a formable rigid backing on the other side of said shell to have a planar side parallel to the plane of the planar negative side of the shell corresponding to said one planar side of the pattern; and forming said backed shell into predetermined circular shape with the negative side of the shell exposed radially outwardly.

4. A method as in claim 3, including the steps of chromeplating said negative side of the shell.

References Cited

UNITED STATES PATENTS

| | | | |
|---|---|---|---|
| 283,560 | 8/1883 | Blohm | 18—47 |
| 375,869 | 1/1888 | Cummings | 164—98 |
| 395,488 | 1/1889 | Dale | 72—170 |
| 1,073,105 | 9/1913 | Dunton | 164—98 X |
| 2,204,263 | 6/1940 | Thoresen | 18—47 X |
| 2,722,261 | 11/1955 | Bishop | 72—170 X |
| 2,726,972 | 12/1955 | Corral | 148—11.5 |
| 2,726,973 | 12/1955 | Corral | 148—11.5 |
| 3,142,887 | 8/1964 | Hülck et al. | 72—170 X |

JOHN F. CAMPBELL, *Primary Examiner.*

PAUL M. COHEN, *Assistant Examiner.*

U.S. Cl. X.R.

18—47; 72—170; 29—528; 264—225; 164—98